United States Patent
Inohiza

(10) Patent No.: US 7,793,088 B2
(45) Date of Patent: Sep. 7, 2010

(54) WIRELESS COMMUNICATION DEVICE AND SYSTEM STARTUP METHOD FOR THE SAME

(75) Inventor: Hirohiko Inohiza, Yokohama (JP)

(73) Assignee: Kyocera Corporation, Kyoto (JP)

( * ) Notice: Subject to any disclaimer, the term of this patent is extended or adjusted under 35 U.S.C. 154(b) by 395 days.

(21) Appl. No.: 11/459,775

(22) Filed: Jul. 25, 2006

(65) Prior Publication Data

US 2007/0028085 A1 Feb. 1, 2007

(30) Foreign Application Priority Data

Jul. 28, 2005 (JP) .......................... P2005-218647

(51) Int. Cl.
- G06F 9/00 (2006.01)
- H04B 1/38 (2006.01)
- H04W 4/00 (2009.01)
- H04M 11/00 (2006.01)

(52) U.S. Cl. .............. 713/1; 713/2; 713/100; 455/73; 455/403; 455/422.1

(58) Field of Classification Search .............. 713/1, 713/2, 100; 455/73, 422.1, 403

See application file for complete search history.

(56) References Cited

U.S. PATENT DOCUMENTS

| 6,564,177 | B1 | 5/2003 | Matsunaga | 703/21 |
| 6,564,318 | B1 * | 5/2003 | Gharda et al. | 713/2 |
| 6,785,808 | B2 * | 8/2004 | Huntington et al. | 713/2 |
| 7,334,228 | B2 * | 2/2008 | Clohessy et al. | 718/104 |
| 2003/0051126 | A1 * | 3/2003 | Numano et al. | 713/1 |
| 2005/0036490 | A1 | 2/2005 | Mourareau | |

FOREIGN PATENT DOCUMENTS

| CN | 1586085 A | 2/2005 |
| CN | 2691173 Y | 4/2005 |
| JP | 2000-322264 | 11/2000 |
| JP | 2001-209545 | 8/2001 |

OTHER PUBLICATIONS

Chinese language office action and its English language translation for corresponding Chinese application No. 200610107784.3, Jul. 20, 2008.

* cited by examiner

Primary Examiner—Stefan Stoynov
(74) Attorney, Agent, or Firm—Hogan Lovells US LLP

(57) ABSTRACT

A wireless communication device includes a first storage unit, a second storage unit, an operating unit, and a control unit. The first storage unit further includes a plurality of separate storage areas corresponding to a plurality of program codes, respectively. The second storage unit is used to execute the plurality of program codes. The operating unit is configured to issue instructions to turn on power and to start up an application. The control unit is configured to load, on receipt of the instructions from the operating unit, at least one program code required to start up the application from the first storage unit into the second storage unit. The control unit is also configured to execute the at least one program code to start up the application. The at least one program code is included in the plurality of program codes.

10 Claims, 5 Drawing Sheets

FIG. 3

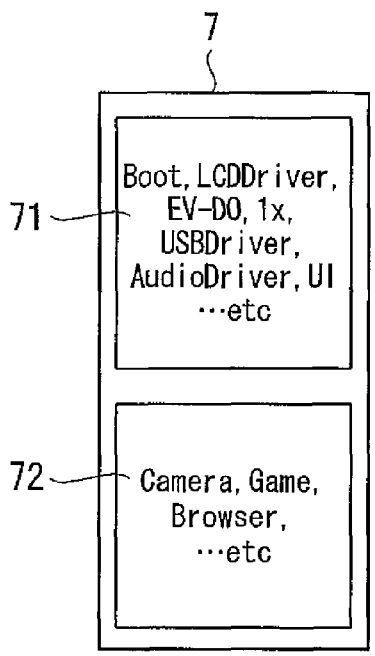

- 71 → Boot, LCDDriver, EV-DO, 1x, USBDriver, AudioDriver, UI ···etc
- 72 → Camera, Game, Browser, ···etc

FIG. 4

| DEDICATED KEY | APPLICATION | USED MODULE |
|---|---|---|
| CAMERA KEY | CAMERA | · Boot<br>· LCDDriver<br>· CameraDriver<br>· FileSystem<br>······ |
| MAIL KEY | EDIT MAIL – SEND/RECEIVE | · Boot<br>· LCDDriver<br>· 1x<br>· FileSystem<br>······ |
| GAME KEY | GAME | · Boot<br>· LCDDriver<br>· SoundDriver<br>· BREW<br>······ |
| TELEPHONE KEY | TELEPHONE | · Boot<br>· LCDDriver<br>· SoundDriver<br>· 1x<br>······ |
| ⋮ | ⋮ | ⋮ | ns
WIRELESS COMMUNICATION DEVICE AND SYSTEM STARTUP METHOD FOR THE SAME

BACKGROUND OF THE INVENTION

1. Field of the Invention

The present invention relates to a wireless communication device and a system startup method for this apparatus.

Priority is claimed on Japanese Patent Application No. 2005-218647, filed Jul. 28, 2005, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In wireless communication devices that have a wireless communication function such as, for example, mobile telephones, system programs and data and the like are stored in a ROM (read only memory) that generally uses a NOR flash memory. The NOR flash memory can accept for random accesses. An MPU (micro processing unit) is configured to directly read contents that are stored in the NOR flash memory and to execute commands or instructions and further to acquire data and the like. When this system is started up, it is normal for initialization processing to be performed in the sequence of hardware initialization, memory check and initialization, and then initialization of each module. After this initialization processing sequence has ended, the system changes to a wait screen and enters an application startup stand-by state. Because of this, increasing the size of the system program increases the time that is required for initialization, resulting in that the application startup also takes a considerable length of time. This applies considerable stress to a user when the user has turned on the power and wishes to execute an application immediately.

Moreover, a flash memory having greater capacity and a lower price is being increasingly demanded for memory in order to store software and data and the like as the size of mobile telephone software, for example, system programs and applications, has increased. Consequently, the use of NAND flash memory instead of NOR flash memory is attractive. This NAND flash memory has the features of having large capacity and a low price, while also having fast access speeds and a small device size. Conversely, it has the defect of not allowing random access, and program codes and data cannot be used unless the contents of the NAND) flash memory are first loaded into RAM (random access memory). In addition, when the system is being started up, after the contents of the NAND flash memory have thus been loaded into RAM, the same initialization processing as is performed for NOR flash memory is performed. As a result, the problem arises that an even longer time is required for startup than when NOR flash memory is used.

Because the scale of software has become even larger as mobile telephones have become furnished with even greater functionality, shortening this system startup time has become an extremely pressing problem. For example, if the digital camera function of mobile telephones is considered, then it can be seen that the differentiation of functions between mobile telephones and modern digital cameras is gradually disappearing and the same startup time as is normal in modern digital cameras is demanded in mobile telephones. In order to solve such problems, a method is disclosed in Japanese Unexamined Patent Application, First Publication, No. 2000-322264 in which program code for various system programs and applications and the like is stored in storage areas in ROM that have been allocated for the respective program codes. Based on information tables that show the priority sequence when the relevant program code is being loaded, loading is performed in sequence starting from the program code that requires the fast response.

However, when power is turned on, the user must determine this order of response, namely, which application is to be started up from among a plurality of applications, and this changes in accordance with the usage requirements of the user. In the conventional technology, the program code loading sequence, namely, which application is to be started up is fixed, so that there is little flexibility and the needs of the user are not satisfied. In view of the defects in a fixed system startup such as those in the conventional technology, the present invention provides a wireless communication device and a system startup method for this device that are highly usable and that enable applications required by a user to be given precedence during startup.

In view of the above, it will be apparent to those skilled in the art from this disclosure that there exists a need for an improved device and/or method. This invention addresses this need in the art as well as other needs, which will become apparent to those skilled in the art from this disclosure.

SUMMARY OF THE INVENTION

In accordance with a first aspect of the present invention, a wireless communication device may comprise a first storage unit, a second storage unit, an operating unit, and a control unit. The first storage unit may include a plurality of separate storage areas corresponding to a plurality of program codes, respectively. The second storage unit is used to execute the plurality of program codes. The operating unit can be configured to issue instructions to turn on power and to start up an application. The control unit can be configured to load, on receipt of the instructions from the operating unit, at least one program code required to start up the application from the first storage unit into the second storage unit. The control unit can also be configured to execute the at least one program code to start up the application. The at least one program code is included in the plurality of program codes.

Preferably, when the control unit detects that the started application has ended, the control unit can load at least one unloaded program code from the first storage unit into the second storage unit. The at least one unloaded program code is included in the plurality of program codes.

Preferably, the wireless communication device may further comprise a load detecting device that detects a load in the control unit. In this case, the control unit can also be configured to load at least one unloaded program code from the first storage unit into the second storage unit based on a load created by processing the started application. The at least one unloaded program code is included in the plurality of program codes. The at least one unloaded program code may comprise a program code that is required for wireless communication functions.

In accordance with a second aspect of the present invention, a system startup method for a wireless communication device may comprise loading at least one program code into a storage unit, and executing the at least one program code as loaded to start up the application. The at least one program code can be loaded into the storage unit on receipt of instructions to turn on power and to start up an application. The at least one program code is required to start up the application. The storage unit is used to execute the at least one program code.

Preferably, when the started application has ended, at least one unloaded program code can be loaded into the storage unit.

Preferably, the at least one unloaded program code can be loaded into the storage unit, based on a load created by processing the started application.

Preferably, the at least one unloaded program code may comprise a program code that is required for wireless communication functions.

In accordance with the present invention, when turning on the power, priority can be given to first starting up an application desired by a user. As a result, the startup time is shortened and improved convenience can be achieved.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure:

FIG. 3 is a view illustrating a configuration of program code areas in accordance with a comparative example;

FIG. 4 is a view illustrating a typical example of a startup information table in accordance with the embodiment of the present invention;

DETAILED DESCRIPTION OF THE INVENTION

An embodiment of the present is described below with reference made to the drawings. Examples of wireless communication devices include mobile telephones, car navigation devices and personal computers (PC) that incorporate a wireless communication function, and personal digital assistants (PDA) and the like, however, in the present embodiment, a description is given using a mobile communication terminal as an example of a wireless communication device. Moreover, the mobile communication terminal illustrated in this description has various applications such as, for example, a wireless communication function, an email function, a digital camera function, and a digital broadcast reception function for television and radio and the like. Note that, in the description below, a comparison is made with an example in which the program code is split between a modem code area 71 that stores program code for drivers, UI, and communication related modules and the like and an application code area 72 that stores program code for other applications and is then stored in a first storage device, for example, ROM.

Figure 1:
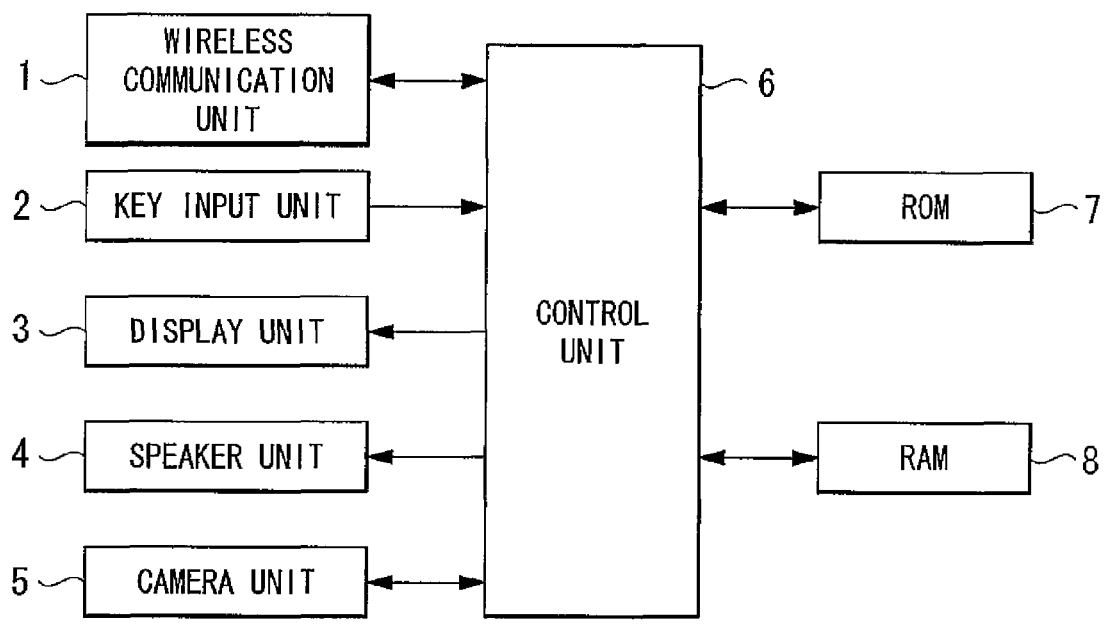
FIG. 1 is a block diagram illustrating a configuration of a mobile communication terminal in accordance with an embodiment of the present invention.

FIG. 1 is a block diagram illustrating a configuration of a mobile communication terminal in accordance with an embodiment of the present invention. As is shown in the drawing, this mobile communication terminal is formed by a wireless communication unit 1, a key input unit 2, for example, an operating unit, a display unit 3, a speaker unit 4, a camera unit 5, a control unit 6, for example, a control device, ROM 7, for example, a first storage device, and RAM 8, for example, a second storage device.

The wireless communication unit 1 performs wireless communication with mobile communication base stations under the control of the control unit 6 using a predetermined communication format such as, for example, a code division multiple access (CDMA) format. The key input unit 2 is formed by a dial key, function keys, a power on key, and dedicated application startup keys. Operating information for these keys is output to the control unit 6 as operating signals. Note that the dedicated application startup keys instruct that power is turned on and that the relevant applications is started up, and are individually provided in accordance with the respective applications with which the mobile communication terminal is equipped. For example, a dedicated key corresponding to the startup of the digital camera function and a dedicated key corresponding to the startup of the digital broadcast reception function are provided. Note that it is also possible for application startup and power on to not be dedicated application startup keys but to be formed so as to double with other keys.

The display unit 3 is, for example, a liquid crystal display or an organic EL display and displays various messages, telephone numbers, or images and the like based on display signals that are input from the control unit 6. The speaker unit 4 outputs speech or sound to the outside based on audio signals that are input from the control unit 6. The camera unit 5 is, for example, a charge coupled device (CCD) camera, and, under the control of the control unit 6, outputs image signals of photographed images to the control unit 6.

The control unit 6 controls the overall operation of the mobile communication terminal based on a predetermined control program that has been stored in advance in the ROM 7, on operating signals that are input from the key input unit 2, and on the communication state of the wireless communication unit 1. In addition, if the control unit 6 detects as part of a characteristic control processing that is based on the aforementioned control program that, when the power was OFF, one of the above described dedicated application startup keys has been pressed for a fixed time, then the power is turned ON and the program code of the application that corresponds to the pressed key as well as the program code of the module that is required to start up the relevant application are loaded into the ROM 7 from the RAM 8, and the respective program codes that have been loaded are executed and the application is started up. Note that this application startup processing is described below in detail.

Figure 2:
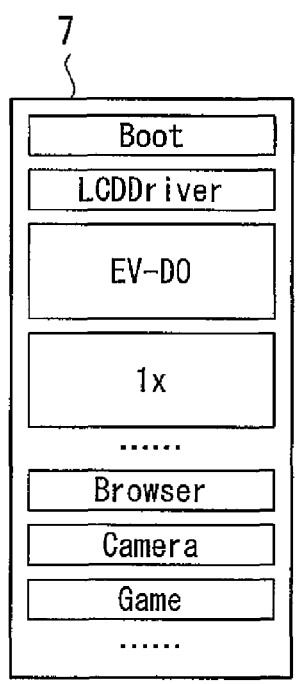
FIG. 2 is a view illustrating a configuration of program code areas for modules and applications of a ROM included in a wireless communication device of FIG. 1 in accordance with the embodiment of the present invention.

The ROM 7 is, for example, NAND flash memory, and stores ahead of time control programs to be executed by the control unit 6. FIG. 2 is a view illustrating a configuration of program code areas for modules and applications of a ROM included in a wireless communication device of FIG. 1 in accordance with the embodiment of the present invention. As is shown in FIG. 2, the ROM 7 independently stores in their respective individual storage areas the program code for control programs, namely, for "Boot", "LCD Driver", "EV-DO", "1x", "Browser", "Camera", and "Game". Note that this "1x"

indicates a cdma 2000 1x format, while "EV-DO" indicates a cdma2000 1x EV-DO format, which is an extension format of the cdma2000 1x format.

FIG. 3 is a view illustrating a configuration of program code areas in accordance with a comparative example. The ROM 7 is divided into a modem code area 71 and an application code area 71. The program code is stored in the ROM 7 in two separate areas, namely, the modem code area 71 and the application code area 72. In the modem code area 71, program codes for drivers, UT, communication related modules and the like are stored. In the application code area 72, other program codes for other applications are stored. In this example, the program code inside the ROM 7 is divided into two code groups and it is not possible to load the program code of each module individually into the RAM 8. Namely, because the program code of each module is a single block in the modem code area 71, when the power is turned ON, the entirety of the program code in the modem code area 71 is loaded into the RAM 8, and it is necessary to execute the relevant loaded program code and perform initialization processing. However, in the present embodiment, as is shown in FIG. 2, because the program codes are stored independently in respective individual storage areas in the ROM 7, it is possible to load each module or application individually in the RAM 8.

FIG. 4 is a view illustrating a typical example of a startup information table in accordance with the embodiment of the present invention. Furthermore, the ROM 7 also stores a startup information table such as that shown in FIG. 4 that shows the dedicated application startup keys, the applications that correspond to the relevant dedicated key, and the program code for the startup modules and applications that are required to start up that application. The RAM 8 is used as a working area that is used to execute the program code loaded from the ROM 7.

Next, a description will be given of the application startup processing when the power is turned on in the mobile communication terminal, specifically, the control unit 6, which has the above described structure.

Firstly, to provide a comparison, a description will be given of the application startup processing of an example in which, as is shown in FIG. 3, the program code is separated between a modem section and an application section and stored. Note that the mobile communication terminal in this example has different methods for storing program code as is shown in FIG. 3, and while no dedicated application startup key is provided, the remainder of the component elements are the same as those of the present embodiment.

Figure 5:
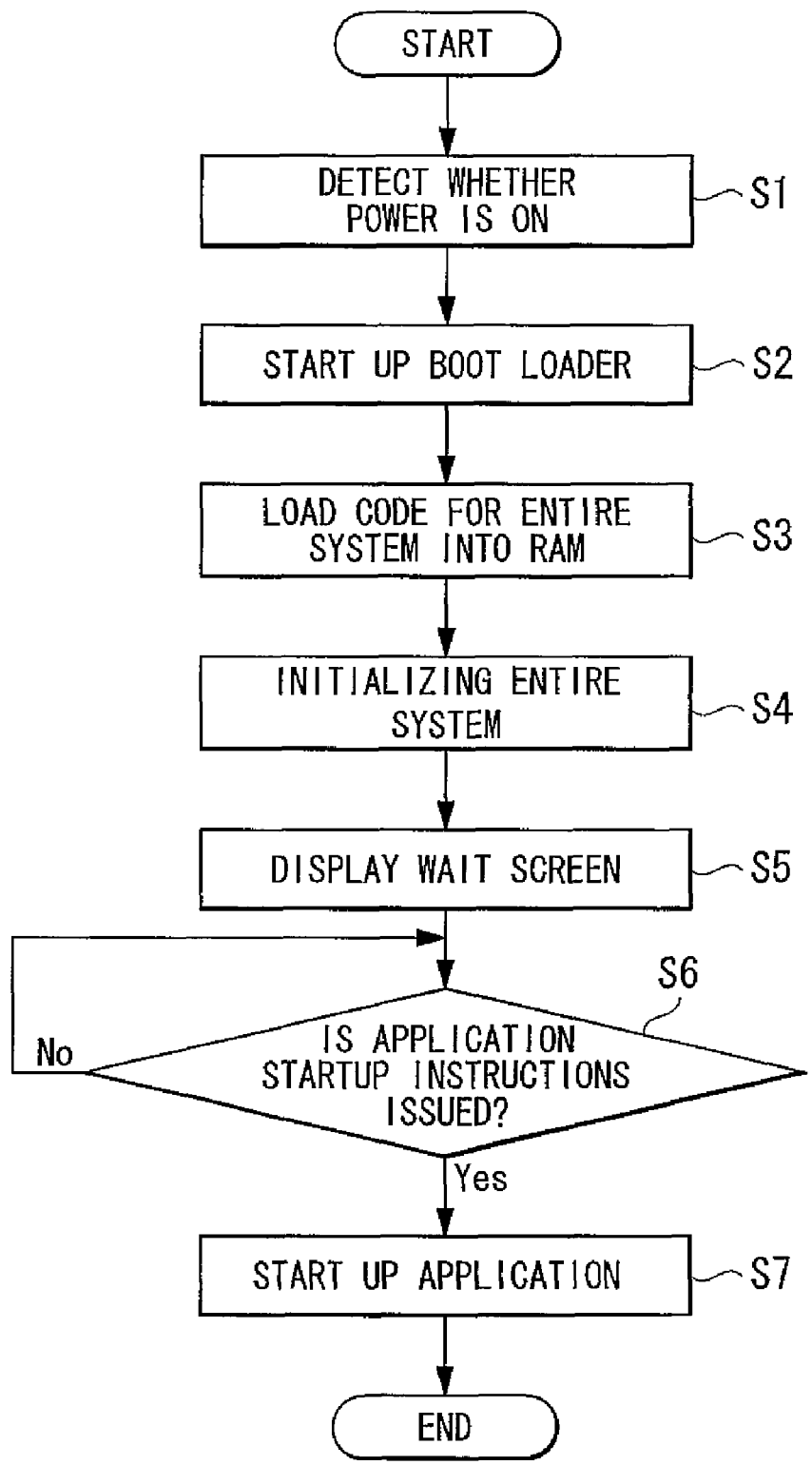
FIG. 5 is a flowchart illustrating an application startup processing flow after power is turned on in accordance with a comparative example.

FIG. 5 is a flowchart illustrating an application startup processing flow after power is turned on in accordance with a comparative example. Firstly, if the power on key is pressed for a fixed time by a user, the control unit 6 determines that this is a command to turn on the power and turns on the power of the mobile communication terminal (step S1). The control unit 6 then starts up a Boot loader; for example, the program that is executed first when the power is turned on and that loads all of the program code that is stored in the ROM 7 in the RAM 8 (step S2). As a result of the Boot loader starting up, all of the program code that is stored in the ROM 7 is loaded into the RAM 8 (step S3). The control unit 6 then performs system initialization processing (step S4) and, once this initialization processing has ended, a wait screen is displayed on the display unit 3 (step S5).

Next, the control unit 6 determines whether or not an application start command has been made based on an operation of the key input unit by the user (step S6). If the result of this determination is YES, namely, if an application start command has been made, the program code for that application that has been loaded into the RAM 8 is executed, and the relevant application is started up (step S7). If, however, the result of the determination in step S6 is NO, namely, if an application start command has not been made, the waiting state is maintained until a start command is received.

In this manner, in the startup processing for an application that is performed when the power is turned on in the example shown in FIG. 3, because all of the program code that is stored in the ROM 7 is loaded into the RAM 8 and initialization processing is performed for the entire system, an extremely long time lapses before application startup preparations are complete.

Figure 6:
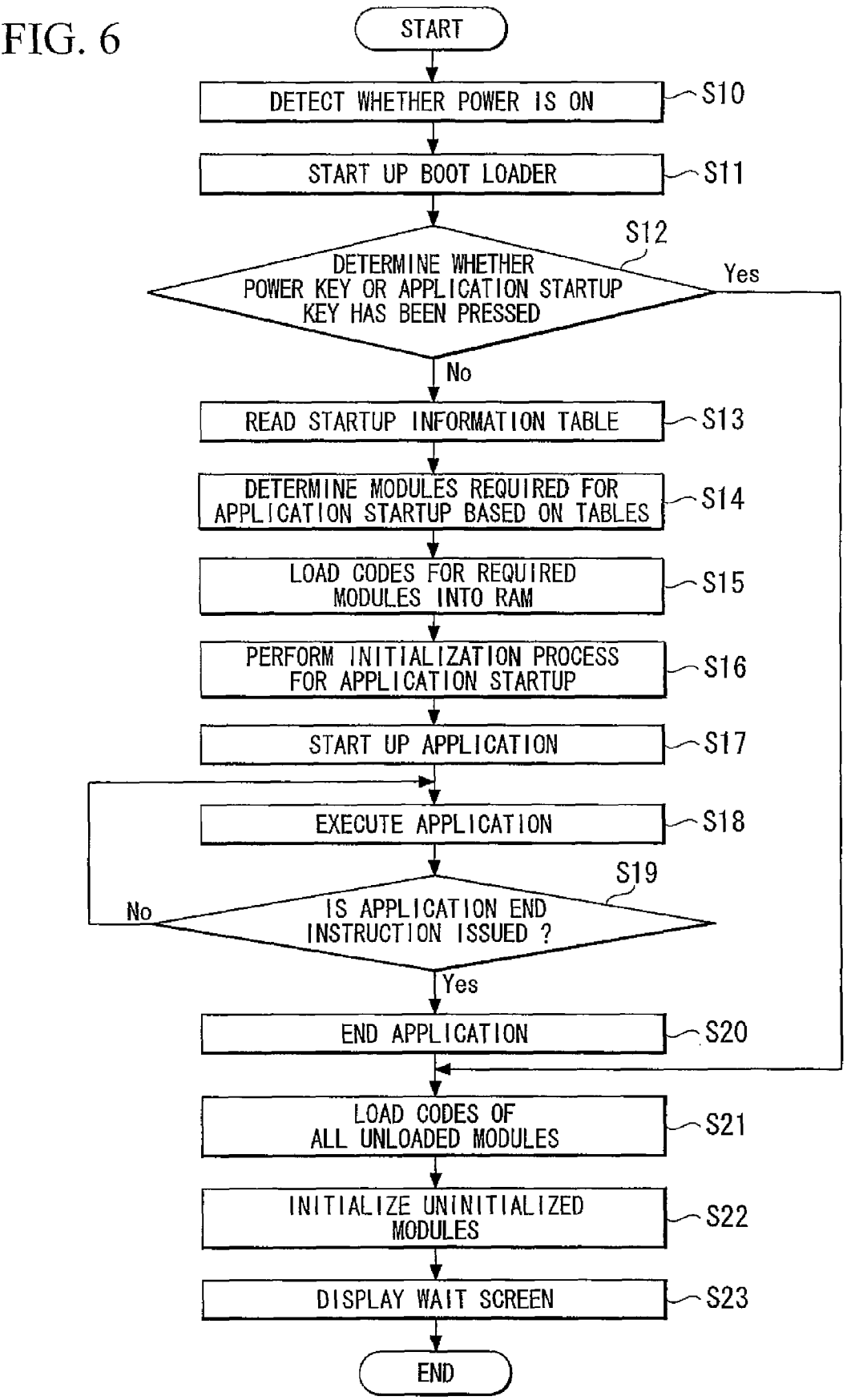
FIG. 6 is a flowchart illustrating an application startup processing flow after power is turned on in accordance with the embodiment of the present invention.

Based on this, a description will now be given using the flowchart shown in FIG. 6. FIG. 6 is a flowchart illustrating an application startup processing flow after power is turned on in accordance with the embodiment of the present invention. Firstly, if the power on key or a dedicated application startup key is pressed by a user for a fixed time, the control unit 6 determines that this is a power on command and the power of the mobile communication terminal is turned on (step S10), and the Boot loader is started up (step S11). The control unit 6 then determines the cause of the startup, for example, whether the power on key has been pressed or whether a dedicated application startup key has been pressed (step S12).

In this step S12, if it is determined that a dedicated application startup key has been pressed, for example, if the result of the determination is NO, the control unit 6 reads the startup information table (see FIG. 4) that is stored in the ROM 7 (step S13), and, based on this startup information table, determines the application that corresponds to this dedicated application startup key that has been pressed by the user and also the modules that are required for the startup of the relevant application (step S14). The program code for the modules required for application startup is then loaded from the ROM 7 into the RAM 8 (step S15).

Next, the control unit 6 executes the program code of the modules that are required for the application startup which has been loaded into the RAM 8, and performs the initialization processing that is required for the application startup (step S16). When the initialization processing that is required for the application startup has ended, the control unit 6 loads the program code for the application from the ROM 7 into the RAM 8, executes the program code of the relevant application and starts up the application that has been commanded by the user (step S17).

The control unit 6 then executes the application in accordance with the operation of the key input unit 2 by the user (step S18), and determines whether or not there has been a command from the user to end the application via an operation of the key input unit 2 (step S19). If the result of the determination in step S19 is NO, namely, if there is no command to end the application, the routine returns to the processing of step S18. If, however, the result of the determination in step S19 is YES, namely, if there is a command to end the application, the control unit 6 ends the application (step S20), loads all of the program code of the unloaded modules from the ROM 7 into the RAM 8 (step S21), executes all of the program code of these unloaded modules, and performs initialization processing for any uninitialized modules (step 822). When the initialization processing for the uninitialized modules has ended, the control unit 6 causes the wait screen to be displayed on the display unit 3, and enters a waiting state (step S23). Note that the "unloaded modules" referred to here indicates programs that relate to wireless communication functions in order for the device to operate as a conventional communication device. If, however, in step S12, it is determined that the cause of the startup was simply the fact that the power on key was pressed, namely, only the power was turned on, for example, if the result of the determination in step S12 is YES, then the control unit 6 proceeds to the processing of step S21.

As described above, in accordance with this mobile communication terminal, by pressing a dedicated application startup key when turning on the power, priority is given to first loading the modules, for example, program codes that are required for the application desired by the user. As a result, the startup time is shortened and the improved convenience can be achieved.

As is described above, in the present embodiment, when a command is received to start up an application or to turn on the power of a device, precedence is given to loading program code that is required for the commanded application over program code that is required for wireless communication functions in order for the device to operate conventionally as a wireless communication device.

Note that the present invention is not limited to the above described embodiment and modified examples such as those described below, for example, can be considered.

In the above described embodiment, a description is given of when a mobile communication terminal is used as a wireless communication device, however, the present invention is not limited to this.

Figure 7:
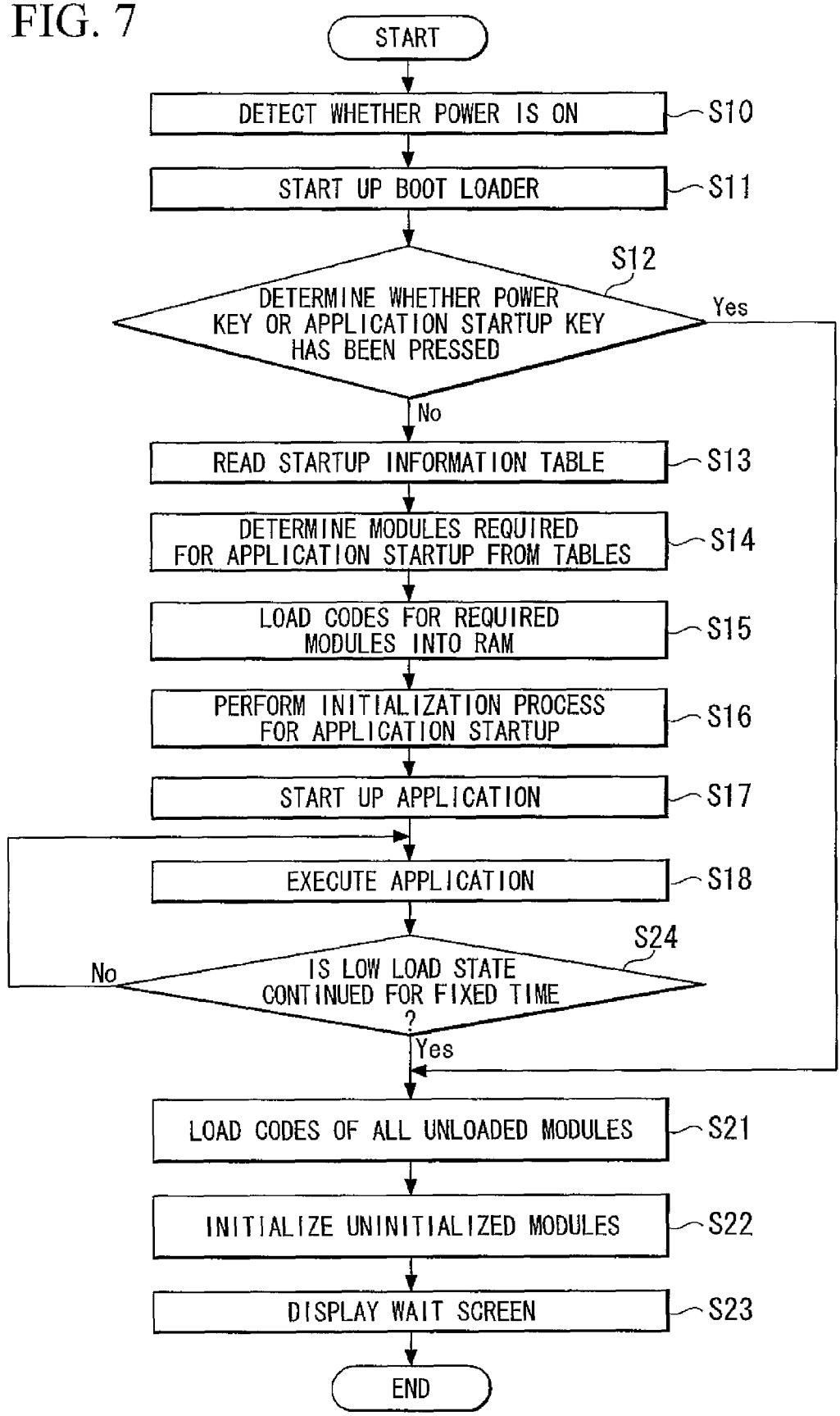
FIG. 7 is a flowchart illustrating another application startup processing flow after power is turned on in accordance with the modified embodiment of the present invention.

FIG. 7 is a flowchart illustrating another application startup processing flow after power is turned on in accordance with the modified embodiment of the present invention. In the above described embodiment, in step S19 shown in FIG. 6, a determination is made as to whether or not an end application command has been received from a user via the operation of the key input unit 2. However, as shown in FIG. 7, the process of step S24 can be performed instead of the above-described processes of steps S19 and S20 shown in FIG. 6. The control unit 6 determines whether or not it is in a low load state for a fixed period of time, and if it is in a low load state, to then load all of the program code of the unloaded modules from the ROM 7 into the RAM 8. In this case, a program, for example, a load detecting device to detect the load state of the control unit 6 is stored in the ROM 7 and the load state of the control unit 8 is monitored as a result of this program being executed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

What is claimed is:

1. A wireless communication device comprising:
a first storage unit that includes a plurality of separate storage areas corresponding to a plurality of program codes, respectively;
a second storage unit that is used to execute the plurality of program codes;
an operating unit that issues instructions to turn on power and to start up an application; and
a control unit that loads, on receipt of the instructions from the operating unit, at least one program code required to start up the application from the first storage unit into the second storage unit, and further executes the at least one program code to start up the application, the at least one program code being included in the plurality of program codes,
wherein the control unit provides the at least one program code required to start up the application with a load sequence priority over any program codes that are unnecessary for starting up the application, based on the operating unit instructions to turn on the power and start up the application.

2. The wireless communication device according to claim 1, wherein when the control unit detects that the started application has ended, the control unit loads at least one unloaded program code from the first storage unit into the second storage unit, the at least one unloaded program code is included in the plurality of program codes.

3. The wireless communication device according to claim 2, wherein the at least one unloaded program code comprises a program code that is required for wireless communication functions.

4. The wireless communication device according to claim 1, further comprising a load detecting device that detects a load in the control unit, and,
wherein the control unit loads at least one unloaded program code from the first storage unit into the second storage unit, based on a load created by processing the started application, the at least one unloaded program code is included in the plurality of program codes.

5. The wireless communication device according to claim 4, wherein the at least one unloaded program code comprises a program code that is required for wireless communication functions.

6. A system startup method for a wireless communication device, the system startup method comprising:
loading at least one program code into a storage unit on receipt of instructions to turn on power and to start up an application, the at least one program code being required to start up the application, the storage unit being used to execute the at least one program code; and
executing the at least one program code as loaded to start up the application,
wherein the at least one program code is loaded prior to any program codes that are unnecessary for starting up the application, based on the instructions to turn on the power and start up the application.

7. The system startup method according to claim 6, wherein when the started application has ended, at least one unloaded program code is loaded into the storage unit.

8. The system startup method according to claim 7, wherein the at least one unloaded program code comprises a program code that is required for wireless communication functions.

9. The system startup method according to claim 6, wherein the at least one unloaded program code is loaded into the storage unit, based on a load created by processing the started application.

10. The system startup method according to claim 9, wherein the at least one unloaded program code comprises a program code that is required for wireless communication functions.

* * * * *